R. W. EVANS.
CHAIN FASTENER.
APPLICATION FILED NOV. 16, 1921.

1,420,372.

Patented June 20, 1922.

Inventor
Rudolph W. Evans
By his Attorneys:
Weed & Gray

UNITED STATES PATENT OFFICE.

RUDOLPH WILLIAM EVANS, OF HAMILTON, ONTARIO, CANADA.

CHAIN FASTENER.

1,420,372.  Specification of Letters Patent.  Patented June 20, 1922.

Application filed November 16, 1921. Serial No. 515,502.

*To all whom it may concern:*

Be it known that I, RUDOLPH W. EVANS, a citizen of the United States, residing at Hamilton, in the county of Wentworth, Province of Ontario, and Dominion of Canada, have invented certain new and useful Improvements in Chain Fasteners, of which the following is a specification.

This invention relates to chain fasteners, an object thereof being to provide an improved device of this general type, especially adapted and useful for bringing together and securing or fastening the ends of the side chains of anti-skid devices, and which will be efficient and effective in operation, durable in use, simple in construction and relatively inexpensive to manufacture.

A further object of this invention is to provide an improved device for tightening and fastening the ends of chains, particularly anti-skid chains, the device in the present instance comprising a lever adapted to be pivoted at one end of the chain and provided with means for engagement with any one of several links in another part of the same, or another chain, the lever being provided with novel interlocking means, preferably at opposite ends thereof for effectively securing and retaining the chain links together.

Figure 1:
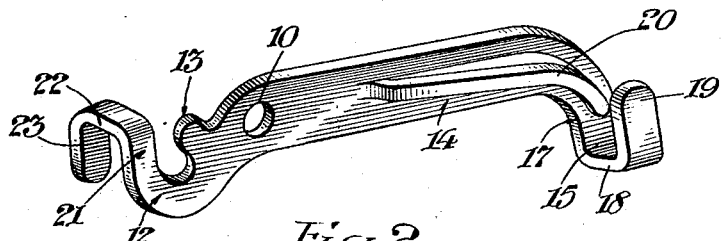
Figure 2:
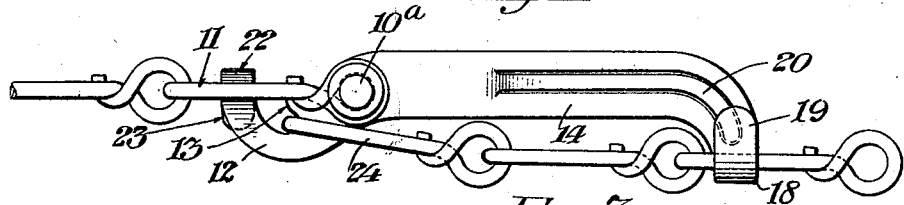
Figure 3:
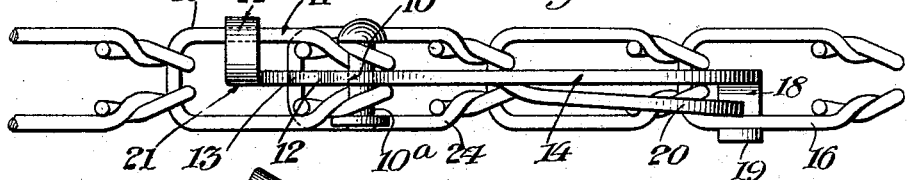
Figure 4:
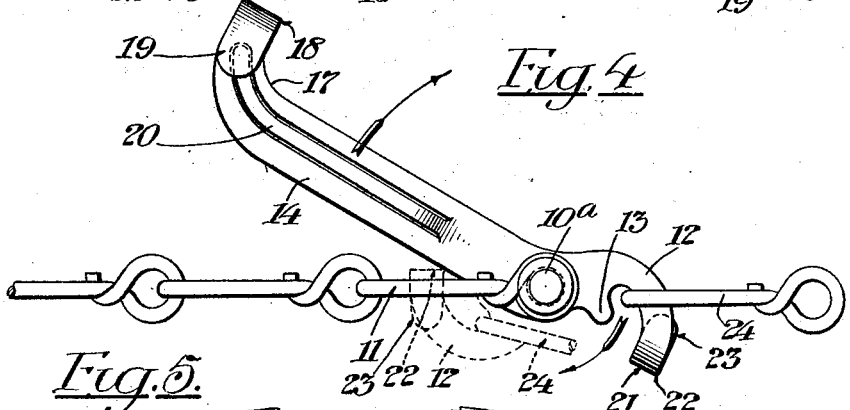
Figure 5:
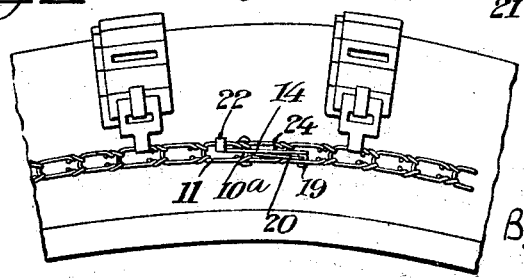

Other objects of this invention will appear in the following description thereof, reference being had to the accompanying drawing forming a part of this specification, wherein like reference characters indicate corresponding parts in the several views, and wherein Fig. 1 is a perspective view of this improved lever; Fig. 2 is a side view illustrating the lever in its locked position, as applied to the ends of a chain; Fig. 3 is a plan view thereof; Fig. 4 is a side view illustrating the device in its initial engaging position for drawing together the ends of the chain, and fastening them; and Fig. 5 is a view of a portion of an automobile tire with this improved device applied to the anti-skid chain thereof.

Referring to the drawings, wherein a preferred embodiment of my invention is illustrated, it will be seen that the lever of this improved chain fastener is formed from a flat blank or bar having pivoted thereto between the ends as at 10, by means of a pin or other pivot $10^a$ and preferably relatively nearer one end than the other, an end link 11 of a chain. One of the link engaging means comprises a hook 12 having a heel or abutment 13 at the rear thereof, or in other words at the side nearest to the pivot pin. The other end or shank portion 14 of this lever is relatively long to afford easy operation or manipulation when the hand is applied to the outer end thereof. This end is in the form of a hook 15 and is adapted to engage a side bar 16 of one of the links in that portion of the chain with which the hook 12 co-acts. Thus it will be seen that this end hook 15 comprises substantially an integral offset portion 17, bent to form a right angled extension 18, the latter being bent upon itself as at 19 to complete the hook. Co-acting with this hooked end 19 is a spring 20 preferably formed integrally from the shank extension 14 of the lever. This spring therefore forms with the hooked end 19 a resilient snap fastener or latch for insuring the retention of the hook in engagement with the side portion 16 of the chain link.

The opposite end of this lever is provided with a hook 12 constructed from an offset portion of the lever, and the end 21 of the hook is constructed of a sufficient length to form another hook, preferably extending laterally in a reverse direction from the hook 15 at the opposite end of the lever. The end 21 is thus bent laterally to form a right angled extension 22, which is bent upon itself as at 23 to complete the hook. Thus it will be seen that one end of the lever is provided with a duplex hook or fastening means and the opposite end of the lever is provided with a resilient snap hook or latch.

In practice, when the lever is in the position shown in Fig. 2, the link 24 would ordinarily tend to slide up on the hook toward the pivot or rivet $10^a$. It is the purpose therefore of the abutment 13 located within and at the rear of the hook to prevent this, and as a result, the link 24 will be caused to lie in the opening formed by the hook and positively prevented from riding up toward the pivot $10^a$.

In operation it will be readily seen that the hook 12 is inserted into a link 24 at the end of the chain, or into a link of another chain, which it is desired to draw toward and connect with the link 11, and thereupon the lever 14 is swung over in the direction of the dotted lines in Fig. 4 to the position illustrated in Fig. 2. By this means the two ends of the chains are positively drawn together, the link 24 as illustrated in Fig. 4 being drawn to the position shown in dotted lines in the figure. The spring controlled snap hook 15 is then caused to engage the side portion or bar 16 of one of the links of the chain by compressing the spring 20 until the hook is fully latched into engagement with the side portion 16, as shown in Figs. 2 and 3. During this operation also it will be noted that the hooked end 15 is projected into the link 11 a sufficient distance for the end 23 to be hooked over the side portion 25 of the link 11. Thus, this link is positively held in interlocking position with the lever 14 by means of the end hook 22. By virtue of this construction therefore, the link 24 is positively and effectually prevented from becoming disengaged from the fastening lever should the anti-skid chain become loose from a tire or for any other reason.

In order to unlock the device for the purposes of removing the chain or disengaging the end, the hook 22 may be disengaged from the side bar 25 of the link 11 and pressure may be applied to the spring 20 to permit removal of the hook 15 from the link 16. Thereupon the lever is thrown back into the position shown in Fig. 4, and the chain link 24 readily removed from the hook 12.

It will be seen therefore, in the present construction that this improved chain fastener comprises a lever adapted to be pivoted to a chain link and having at one end thereof, preferably adjacent to such pivotal connection a duplex hook, or in other words a pair of interlocking means, and also having at the opposite end thereof a single spring controlled latch or hook. One part of the duplex hook it will be noted is constructed to interlock with one end link of the chain and the other part of the duplex hook is constructed to interlock with the opposite end link of the chain.

In other words, the device is provided with one means for drawing or forcing one link of a chain toward another link of a chain and is provided with means for interlocking the two links together.

I claim as my invention:

1. A chain fastener for anti-skid chains comprising a lever adapted to be pivoted to one end of a chain, said lever being provided adjacent to one end thereof with a pair of independently operative interlocking means.

2. A chain fastener for anti-skid chains comprising a lever adapted to be pivoted to one end of a chain, said lever being provided with a pair of independently operative hooks located adjacent to said pivot.

3. A chain fastener for anti-skid chains comprising a lever terminating adjacent to one end in a pair of independently operative hooks and at the opposite end in a spring controlled hook.

4. A chain fastener for anti-skid chains comprising a lever terminating adjacent to one end in a pair of hooks extending in different directions and at the opposite end in a spring controlled hook, and a chain having a part pivotally connected to said lever intermediate said hooks.

5. A chain fastener for anti-skid chains comprising a lever terminating adjacent to one end in a pair of independently operative hooks and at the opposite end in a spring controlled hook, and a chain having a part pivotally connected to said lever intermediate said hooks, said pivotal connection being located adjacent to said pair of hooks.

6. A chain fastener for an anti-skid chain comprising a lever having interlocking means adjacent to each end thereof, a chain having a part thereof pivotally connected to said lever, one of said interlocking means comprising a pair of independently operative link engaging elements.

7. A chain fastener for an anti-skid chain comprising a lever having interlocking means adjacent to each end thereof, a chain having a part thereof pivotally connected to said lever, one of said interlocking means comprising a pair of hooks constructed to engage different links at substantially the same time.

8. A chain fastener for anti-skid chains comprising a lever terminating at each end thereof in interlocking means, a chain having a link thereof pivotally connected to said lever adjacent to one end thereof, one of said interlocking means adjacent to said pivotal connection being constructed to interlock a plurality of links.

9. A chain fastener for anti-skid chains comprising a lever terminating at each end thereof in interlocking means, a chain having a link thereof pivotally connected to said lever adjacent to one end thereof, one of said interlocking means adjacent to said pivot comprising a pair of hooks constructed to simultaneously engage different chain links and the other of said interlocking means comprising a spring-controlled latch.

10. A chain fastener for anti-skid chains comprising a lever provided with fastening means at each end thereof, one of said fastening means comprising a pair of hooks adapted to engage each a link of a chain and substantially at the same time, and means projecting into the opening of one of said hooks for preventing relative movement of the chain link and hook.

11. A chain fastener for anti-skid chains comprising a lever provided adjacent to an end thereof with a pair of hooks, the hook portions of said hooks constructed to open in directions transverse to each other.

12. A chain fastener for anti-skid chains comprising a lever terminating at the ends thereof in a pair of laterally extending hooks, and also having at one end thereof adjacent to one of said hooks a hook opening in a direction opposite thereto.

13. A chain fastener for anti-skid chains comprising a lever provided at the ends thereof with a pair of laterally extending reversely bent hooks.

14. A chain fastener for anti-skid chains comprising a lever terminating at the ends thereof in a pair of laterally extending reversely bent hooks, said lever also having adjacent to one of said hooks a hook opening in a direction opposite thereto.

15. A chain fastener for anti-skid chains comprising a lever provided at opposite sides thereof with a pair of laterally extending reversely bent hooks.

16. A chain fastener for anti-skid chains comprising a lever terminating at opposite sides thereof in a pair of laterally extending reversely bent hooks, said lever also having a hook adjacent to one of said laterally bent hooks.

17. A chain fastener for anti-skid chains comprising a lever having adjacent to one end thereof a pivotal point and terminating in a pair of laterally extending reversely bent hooks, one projecting at one side of the lever and the other at the opposite side thereof and also having between one of said lateral hooks and said pivot point a hook terminating in an abutment, and said lever having a spring co-acting with one of said lateral hooks.

18. A chain fastener for an anti-skid chain comprising a lever having one or more unitary attaching means, one of said means constructed to simultaneously interconnect a plurality of chain links.

Signed at Hamilton, Province of Ontario, Dominion of Canada, this 3rd day of November, 1921.

RUDOLPH WILLIAM EVANS.